US008799045B2

(12) United States Patent
Heinz et al.

(10) Patent No.: US 8,799,045 B2
(45) Date of Patent: Aug. 5, 2014

(54) SYSTEM AND METHOD FOR TRACKING COMMUNICATIONS WITHIN AN ORGANIZATION

(75) Inventors: John W. Heinz, Olathe, KS (US); Melvin L. Shoats, Kansas City, MO (US)

(73) Assignee: CenturyLink Intellectual Property LLC, Denver, CO (US)

( * ) Notice: Subject to any disclaimer, the term of this patent is extended or adjusted under 35 U.S.C. 154(b) by 1235 days.

(21) Appl. No.: 11/998,547

(22) Filed: Nov. 30, 2007

(65) Prior Publication Data

US 2009/0144106 A1 Jun. 4, 2009

(51) Int. Cl.
*G06Q 10/00* (2012.01)

(52) U.S. Cl.
USPC .......... 705/7.15; 705/7.12; 705/7.42; 705/345

(58) Field of Classification Search
CPC .............................................. G06Q 10/063114
USPC ................................ 705/7.11–7.42
See application file for complete search history.

(56) References Cited

U.S. PATENT DOCUMENTS

| | | | | |
|---|---|---|---|---|
| 7,529,724 | B1 * | 5/2009 | Marshak et al. ...................... 1/1 |
| 7,873,156 | B1 * | 1/2011 | Blair ...................... 379/265.06 |
| 2001/0008999 | A1 * | 7/2001 | Bull ............................... 705/11 |
| 2002/0040313 | A1 * | 4/2002 | Hunter et al. .................... 705/9 |
| 2002/0077080 | A1 * | 6/2002 | Greene ......................... 455/412 |
| 2002/0123983 | A1 * | 9/2002 | Riley et al. ........................ 707/1 |
| 2003/0126001 | A1 * | 7/2003 | Northcutt et al. ................ 705/8 |
| 2004/0229560 | A1 * | 11/2004 | Maloney ...................... 455/3.01 |
| 2004/0249650 | A1 * | 12/2004 | Freedman et al. ................. 705/1 |
| 2005/0108077 | A1 * | 5/2005 | Capotosto et al. ................ 705/9 |
| 2005/0216421 | A1 * | 9/2005 | Barry et al. ..................... 705/64 |
| 2005/0222889 | A1 * | 10/2005 | Lai et al. .......................... 705/9 |
| 2006/0002540 | A1 * | 1/2006 | Kreiner et al. ........... 379/265.02 |
| 2006/0147026 | A1 * | 7/2006 | Statham et al. .......... 379/265.02 |
| 2006/0224478 | A1 * | 10/2006 | Harbison et al. ................ 705/32 |
| 2007/0035513 | A1 * | 2/2007 | Sherrard et al. ............. 345/157 |
| 2007/0174390 | A1 * | 7/2007 | Silvain et al. ................. 709/204 |
| 2007/0208604 | A1 * | 9/2007 | Purohit et al. ..................... 705/9 |
| 2008/0091983 | A1 * | 4/2008 | Boss et al. ....................... 714/48 |
| 2008/0154711 | A1 * | 6/2008 | Sahni et al. ..................... 705/11 |

OTHER PUBLICATIONS

Shift Technologies, "ThinMind—Issue Tracking" (www.ThinMind.com) (Date: Unknown).*

* cited by examiner

*Primary Examiner* — Sujay Koneru
(74) *Attorney, Agent, or Firm* — Swanson & Bratschun, L.L.C.

(57) ABSTRACT

A system and method for monitoring operations within an organization may include a database configured to store information representative of communication history between first employees and service provider employees within the organization. The database may include at least one parameter indicative of a purpose for each communication between the employees. A computing system may be in communication with the database and be configured to execute software for enabling the service provider employees to enter information associated with the communications and for generating reports that include statistics associated with the at least one parameter indicative of a purpose for a communication.

16 Claims, 8 Drawing Sheets

SYSTEM AND METHOD FOR TRACKING COMMUNICATIONS WITHIN AN ORGANIZATION

BACKGROUND OF THE INVENTION

Companies and other large organizations generally have employees and departments that operate as internal service providers that handle certain operations to provide services to other departments within an organization. For example, with the proliferation of computer networks at companies, information technology (IT) or information services (IS) departments are responsible for handling questions, problems, training, and other issues of employees needing assistance with operating their computers. To notify the IT department of a computer problem, an employee typically calls or emails the IT department to give notice of the computer problem and provide a general description of the problem. The IT department employee that receives the call or email will typically make a note to him or herself in a log book or other note pad to follow up in resolving the problem. Quite often, if one employee has a certain problem, other employees have the same or similar problems. However, if an IT department has several IT employees who handle service calls, it may take many calls before a common problem is recognized as occurring. In addition, depending on the size of the IT department, if a problem is not timely resolved by a first employee working in the IT department, one or more subsequent calls may be placed to the IT department and a full explanation of the problem may have to be made to a different employee in the IT department—a frustrating task by the employee with the computer problem. While large corporations with tens of thousands of employees amplify these problems, smaller organizations with only a few hundred employees can face the same or similar challenges. Although described as an IT department issue, other types of internal service providers, such as legal departments, within large organizations have similar problems in handling and responding to calls and other forms of communications from employees in other departments.

SUMMARY

To overcome the problem of internal service providers of organizations being able to efficiently and effectively manage and respond to problems of employees in other departments, the principles of the present invention provide for a system and method for managing and responding to service requests to employees within an internal service provider department, such as an IT department. A database may be used to monitor and track communications to a department within an organization. In monitoring the communications, telephone numbers of employees may be used to track calls from particular employees and pre-designated codes may be used to identify a type of problem being experienced by employees calling in the problems. By using pre-designated codes, different employees working within the same department to handle internal service problems may be able to better assist employees when assisting or taking over a task for another co-worker in responding to a call.

One embodiment of a system for monitoring operations within an organization may include a database configured to store information representative of communication history between first employees and service provider employees within the organization. The database may include at least one parameter indicative of a purpose for each communication between the employees. A computing system may be in communication with the database and be configured to execute software for enabling the service provider employees to enter information associated with the communications and for generating reports that include statistics associated with the parameter(s) indicative, of a purpose for a communication.

An embodiment of a method for monitoring operations within an organization may include storing information representative of communication history between first employees and service provider employees within an organization. The information may include at least one parameter indicative of a purpose for the communications between the employees. The service provider employees may be enabled to enter information associated with the communications. Reports that include statistics associated with the parameter(s) indicative of a purpose for a communication may be generated.

BRIEF DESCRIPTION OF THE DRAWINGS

Illustrative embodiments of the present invention are described in detail below with reference to the attached drawing figures, which are incorporated by reference herein and wherein:

FIG. 11 is a screen shot of an exemplary graphical user interface for enabling a user to generate a report showing service requests by department.

DETAILED DESCRIPTION OF THE DRAWINGS

Figure 1:
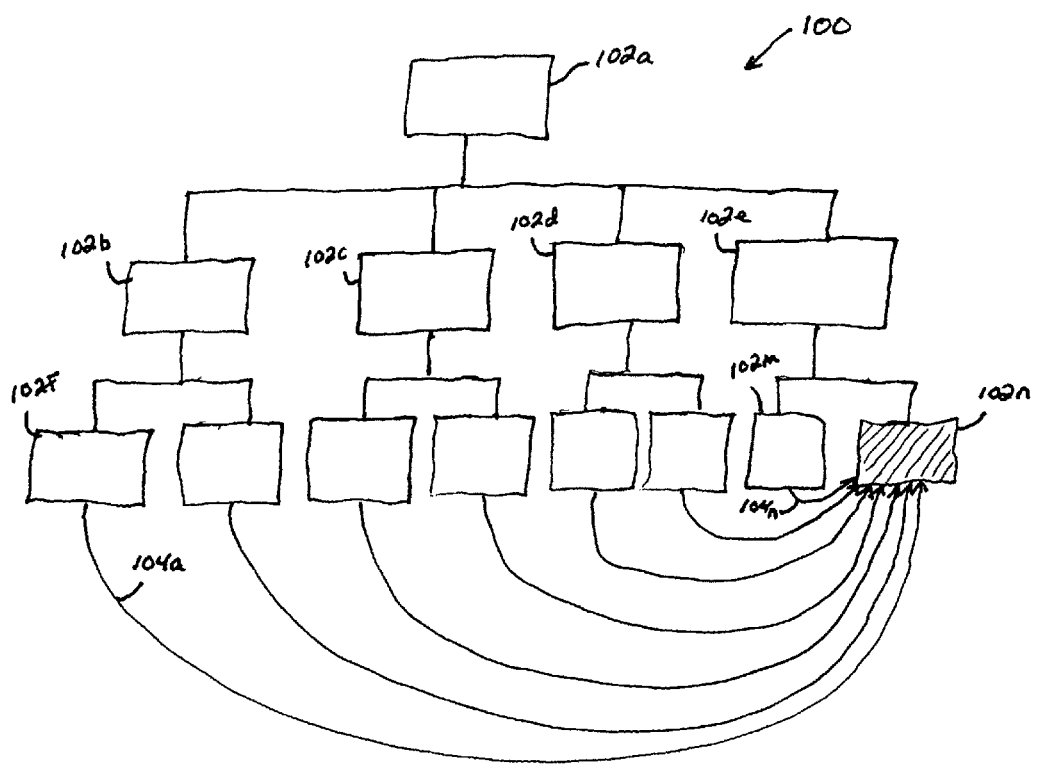
FIG. 1 is an organizational chart of an exemplary organization that shows exemplary departments within the organization, where an internal service provider department is shown to receive service requests by employees of other departments.

FIG. 1 is an organizational chart 100 of an exemplary organization that shows exemplary departments 102a-102n (collectively 102) within the organization, where an internal service provider department 102n is shown to receive service requests 104a-104n (collectively 104) by employees of other departments 102a-102m Although only one service request is shown to be made from each of the departments 102f-102m, it should be understood that multiple calls may be made from the same or different employees of each department. The service requests may be any service request that the service provider department 102n is established to handle, such as IT operations. Because computer problems, for example, have a way of repeating themselves or simply not being fixed even after an IT employee has attempted to correct a problem, service requests may be repeated to correct the same problem. Still yet, two or more different employees within the same or different departments may make a request for correction of the same or similar problem. In accordance with the principles of the present invention, reports may be generated to enable the service provider department 102n to identify multiple service calls for the same or similar problem, thereby alerting the service provider employees of a common problem that may be corrected on a more global scale.

Figure 2:
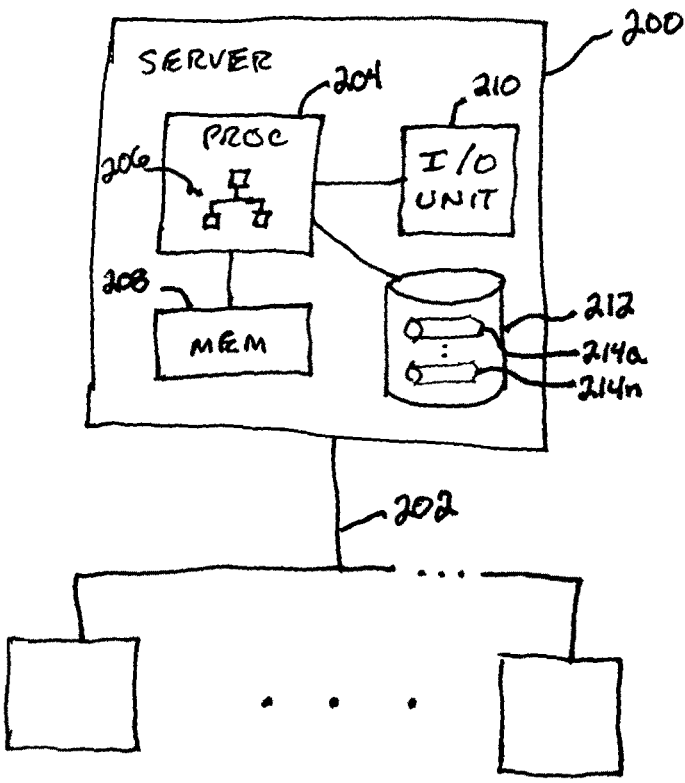
FIG. 2 is a block diagram of an exemplary server operating on a network within an organization to execute a software system in accordance with the principles of the present invention.

FIG. 2 is a block diagram of an exemplary server 200 operating on a network 202 within an organization to execute a software system in accordance with the principles of the present invention. The server 200 may include a processing unit 204, which may include one or more processors, that executes software 206 to enable a user or group of users of an internal service provider department within an organization to receive and manage service requests. The processing unit 204 may be in communication with a memory 208, input/output (I/O) unit 210, and storage unit 212 that stores one or more data repositories 214a-214n (collectively 214). In one embodiment, the data repositories 214 are tables within a database. The data repositories 214 may store information collected from service requests and as provided by employees within the service provider department responding to the service requests. The memory 208 may store information loaded therein during execution of the software 206. The I/O unit 210 may be configured to communicate over the network 202, which may include the Internet, intranet, or any other type of wide area network (WAN or local area network (LAM to enable computing devices 216a-216n operated by service provider department employees to access the server 200. In addition, the I/O unit 210 may be configured to communicate using any communications protocol for communicating over the network 202.

Figure 3:
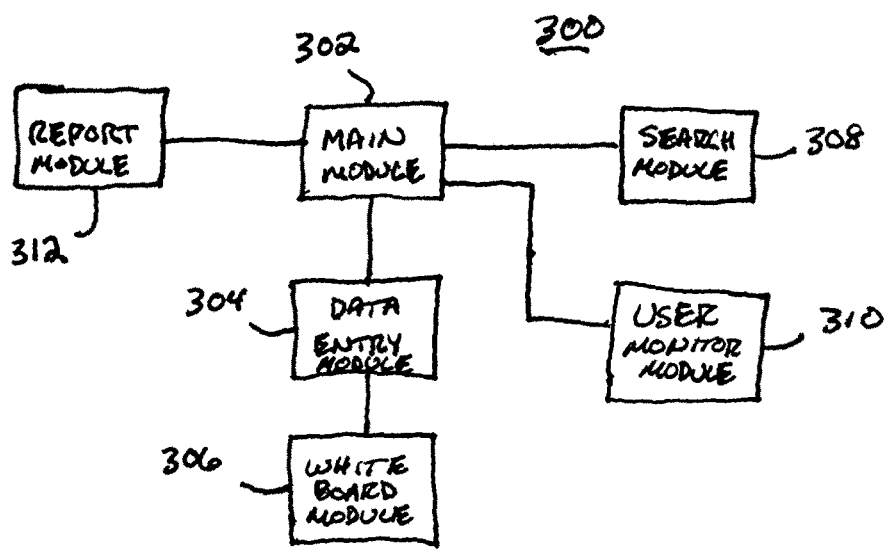
FIG. 3 is a block diagram of an exemplary software system for managing and tracking service requests for employees of an internal service provider within an organization.

FIG. 3 is a block diagram of an exemplary software system 300 for managing and tracking service requests for employees of an internal service provider within an organization. The software system 300 may be the software 206 executed by the processing unit 204 of FIG. 2. The software system 300 may include a main module 302 that controls communication with other modules that perform particular functions. A data entry module 304 may be configured to enable a user to enter data or information received by the user when a service request is placed. For example, an employee calling in a service request from his or her work telephone extension may speak with an employee in the service provider department. The employee in the service provider department may enter the name or identifier of the caller, telephone number or extension, date, time, and problem being experienced, for example, via the data entry module 304. As described further herein, the data entry module 304 may be configured to enable a user to select graphical interface element, such as a radio button, drop-down menu, or other element as understood in the art, to enter one or more data elements.

A white board module 306 may be in communication with the data entry module 304 and be configured to enable users to post their whereabouts on a virtual "white board" so that other employees know where each employee of an internal service provider or other group is located. The white board module 306 may provide the users with a variety of selectable input options, such as "lunch," "working with employee," "gone for day," "at my desk" etc. The user's name may be posted on the virtual white board with his or her status (e.g., at my desk) so that other users may know where he or she is located. Although shown as being in communication with the data entry module 304, the white board module 306 may be in direct or indirect communication with the main module 302 via a different module. The white board is integrated with currently active users in the system as well as their assigned group. The white board may show each user listed under their respective group or department with information indicative of current status, notes, and contact information.

Search module 308 may be in communication with the main module and be configured to enable users to perform a variety of searches, including searching for specific service requests, search requests made by certain employees, search requests being serviced by certain employees, or any other searchable information. The search module 308 may enable a user to select graphical user element(s) or enter one or more keywords in a text entry field when performing a search.

A report module 312 may be in communication with the main module 302 and be configured to enable a user to generate and print or otherwise communicate reports. In one embodiment, the report module 312 may communicate with the search module 308 to find data for particular reports. The report module 312 may have predefined reports, such as service requests for the past week. A user may also generate freeform reports by searching for particular information, such as total number of service requests responded to by each employee within an internal service provider department.

Figure 4:
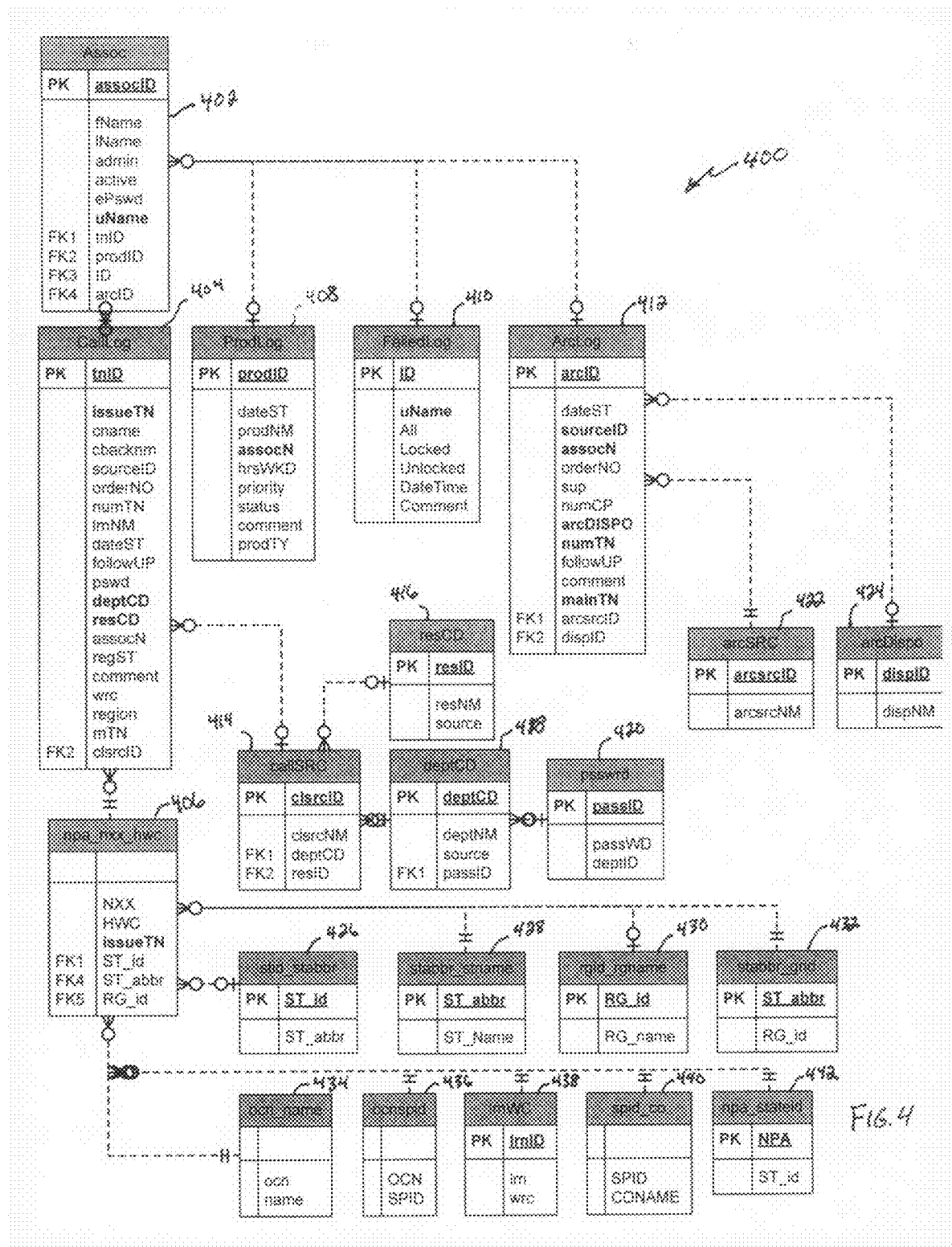
FIG. 4 is a block diagram of an exemplary database architecture for managing service requests.

FIG. 4 is a block diagram of an exemplary database architecture 400 for managing users, service requests, and other information. The database architecture 400 may include a number of different tables, including associate table 402 that includes associate information parameters, CallLog table 404 that includes service request parameters, npa_nxx_hwc table 406 that includes telephone number (e.g., npa (i.e., area code), nxx (i.e., thousands digits), state identifier, state abbreviation, and region identifier). Other tables include ProdLog table 408 that includes product parameters, FailedLog table 410 that includes failed login parameters, ArcLog table 412 that include specialized order parameters, callSRC table 414 that includes call parameters of callers of service requests, resCD table 416 that includes resource parameters, deptCD table 418 that includes department information parameters, and password table 420 that includes password parameters for users that have access to the database. Other tables may include arcSRC table 422 that includes source of service request information (e.g., department id and name), arcDispo table 424 that includes disposition information, stid_stabbr table 426 that stores state abbreviations, stabbr_stname table 428 that stores state abbreviations and names, rgid_rgname table 430 that includes region id's and names, stabbr_grid table 432 that includes state abbreviations and region id's, ocn_name table 434, ocnspid table 436, ImWC table 438, spid_co table 440, and npa_stateid table 442. It should be understood that these tables and configuration of the database architecture are exemplary and that other and/or different tables and configurations may be utilized to provide the same or similar functionality in accordance with the principles of the present invention. Alternatively, rather than using a relational database, other database configurations may be utilized as understood in the art.

Figure 5:
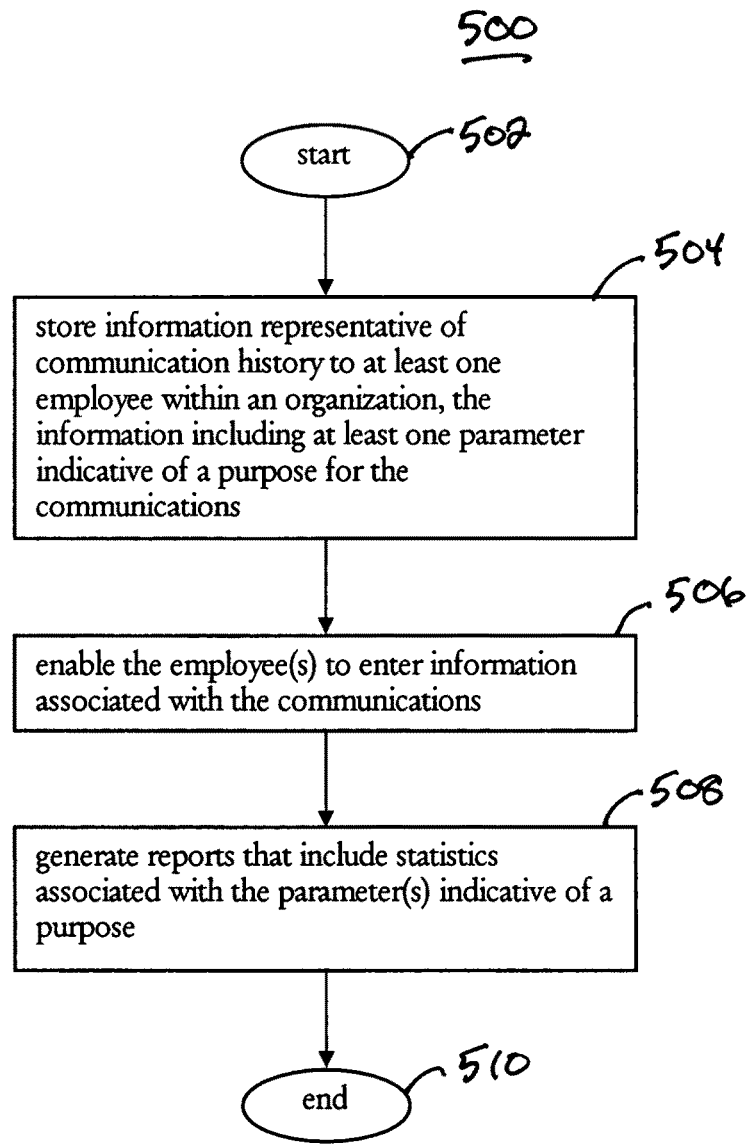
FIG. 5 is a flow diagram of an exemplary process for enabling an internal service provider department to manage and track service requests by employees of other departments.

FIG. 5 is a flow diagram of an exemplary process 500 for enabling an internal service provider department to manage and track service requests by employees of other departments. The process 500 starts at step 502. At step 504, information representative of communication history to at least one employee within an organization may be stored. The information may include at least one parameter indicative of a purpose for the communication. For example, a parameter may indicate that a computer "boot" process is failing. Another parameter may be indicative that a printing problem is being experienced. Still yet, another parameter may indicate that the user is unable to connect to the Internet. It should be understood that a wide variety of parameters, which may be pre-established (e.g., available for selection via radio buttons or other graphical user interface elements) or submitted by a user via a text entry field, may be stored.

At step 506, one or more employees may be enabled to enter information associated with the communications. If an internal service provider employee (e.g., IT employee) is entering the information in response to receiving a telephone call, the internal service provider employee may engage a graphical user interface available to the internal service provider employees to enter service request information when receiving service request submissions. At step 508, reports that include statistics associated with the parameter(s) indicative of a purpose for the service request submissions may be generated. The reports may be generated in response to a user entering one or more report parameters to locate records with the parameter(s) within a data repository to organize and print or otherwise output for viewing. For example, a report may include all service requests submitted over a given time period. The process ends at step 510.

Figure 6:
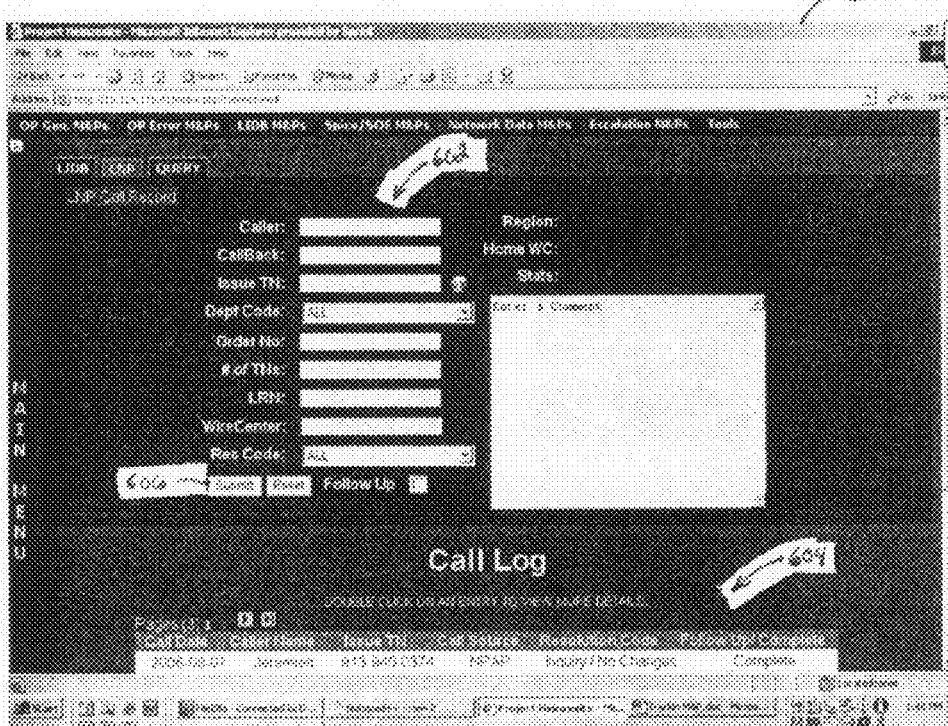
FIG. 6 is a screen shot of an exemplary graphical user interface for enabling a user to input information associated with a service request.

FIG. 6 is a screen shot of an exemplary graphical user interface 600 for enabling a user to input information associated with a service request. An internal service provider employee who receives a call from another employee within an organization may use the graphical user interface 600 to record service requests. A number of input fields 602 may be provided for the internal service provider employee to enter information from a caller, including "Caller," "CallBack," "Issue TN," "Dept Code," "Order No.," "# of TNs," "LRN," "Wire Center," "Res Code," "Follow Up," "Region," Home WC" "State," and "Comments."

The Caller is a name or identifier associated with a caller to be entered. The identifier may be an employee number such that software operating the graphical user interface 600 may access a database to look-up the employee's name. The CallBack is a telephone number that the caller may be reached. The Issue TN is the telephone number that the caller is inquiring about. The DeptCode is the department in which the caller works. As shown, a pull-down menu is provided to enable selection of a department code. The Order No. is an number assigned to the service request. The order number may be assigned automatically (e.g., sequentially or randomly without repeat) by the software program or manually. The # of TNs is an indication of the amount of telephone numbers handled during the trouble call.

The LRN is a local routing number in the format NPA-NXX-XXXX, where NPA is an area code, NXX are the thousands digits, and XXXX is the last four digits of the routing (phone) number. The WireCenter is a regional office of a telecommunications company where telecommunications cables from local customers terminate for entry onto a telecommunications network Each WireCenter entry may be a code or name associated with the location that the caller employee works. If the caller employee does not work at a wire center, then the WireCenter field may be left blank. The Res Code is a resolution code that may be selected from a drop-down menu. The resolution codes may be a code (e.g., 0001, A374) or descriptor (e.g., Inquiry/No Changes, BNS, or otherwise). A Follow Up entry field may be a selectable graphical element, such as a check box, that the service provider employee may simply check to indicate that a service request could not be corrected during an initial call and that some form of follow up, such as a technician visit or a return call with more information, should be made to resolve the service request.

The Region is a region of the organization, such as a state or portion of a country (e.g., New England), in which the caller employee works. The Home WC is the home wire center for the service request. The State is the state in which the service request is being requested. The Comments field is a text entry field in which the service provider employee may enter specific information about a service request being placed. For example, comments indicating devices, software programs, tests that have been performed to try and resolve the problem, or any other information that can provide an internal service provider to better understand the problem to be resolved. Once a service provider employee has completed, all or in part, filling in the input fields 602, the user may press the "Submit" graphical user element 606 to submit the information for entry into a database that stores the service requests or call logs.

Figure 7:
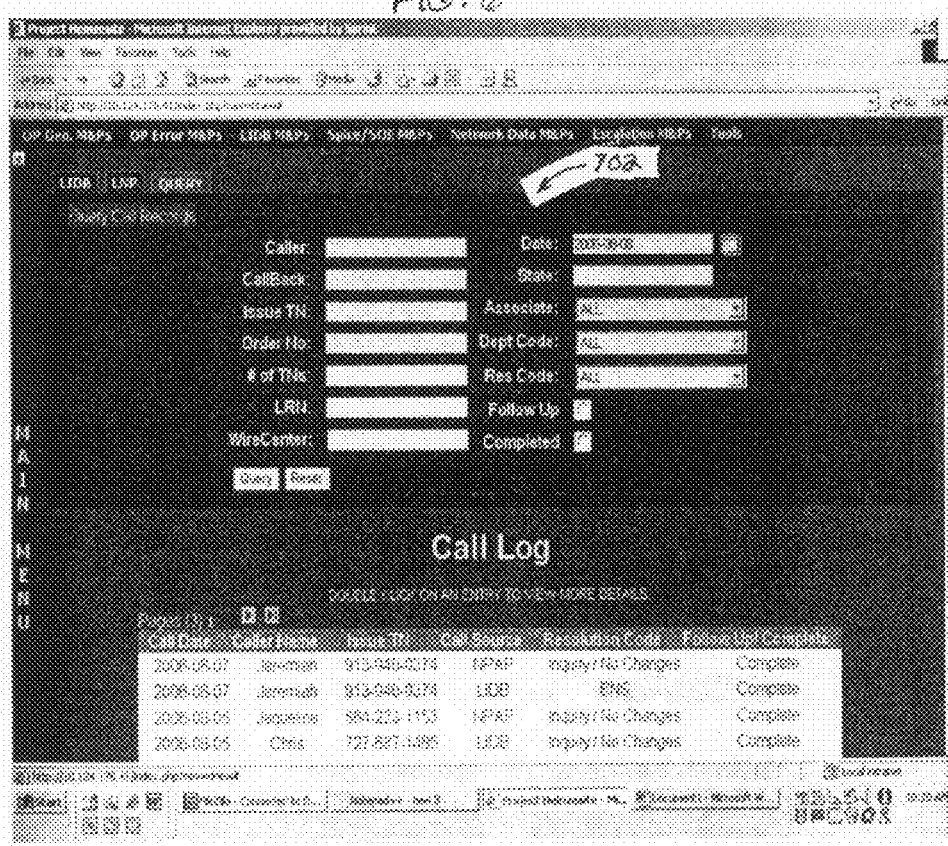
FIG. 7 is a screen shot of an exemplary graphical user interface for enabling a user to query existing service requests.

As further shown in the graphical user interface 600, and further in FIG. 7, a "Call Log" region 604 is shown to include information associated with service requests as entered in the input fields 602 or other input fields and stored in a database. The Call Log may list each service request or aggregate service requests made for the same problem over time. A user may select a call log record to view details of the service request, such as information entered in the text entry field, in the same or separate screen.

FIG. 7 is a screen shot of an exemplary graphical user interface 700 for enabling a user to query existing service requests. Input fields 702 may enable a user to enter information for which he or she wants to search within a call log database to locate one or more records including service requests. As understood in the art, information, such as key words, may be entered into one or more input fields to be used as keys for searching the call log database, where the more input fields that receive information, the narrower the search to enable a user to locate one or more service requests stored as call log(s) in the call log database. A Call Log region 704 may display selectable call logs that are identified by the query and be individually selected to display details of the service request stored therein.

Figure 8:
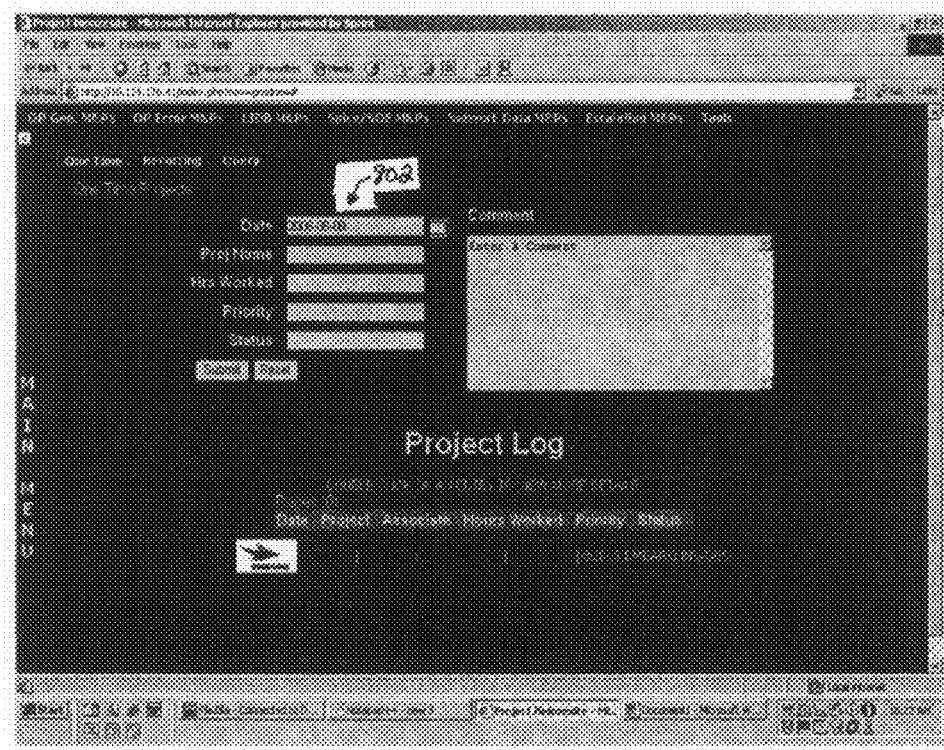
FIG. 8 is a screen shot of an exemplary graphical user interface for enabling a service provider employee to enter information in handling a service request.

FIG. 8 is a screen shot of an exemplary graphical user interface 800 for enabling a service provider employee to enter information in resolving a service request. The service provider employee may enter a date, project name, hours worked on the project, priority, status, and comments about the service request. The information entered may be used to generate statistical information for an organization to monitor. For example, the organization may monitor the amount of time for internal service providers to correct certain service requests or the number of service requests for a certain problem. Based on the statistical information generated by service provider employees, determinations may be made to make corrections to certain products or processes to improve overall efficiencies in the organization. In addition, the information entered by the service provider employees may be available for review by other service provider employees, who may submit suggestions for resolving the pending service requests via a text entry field, for example.

Figure 9:
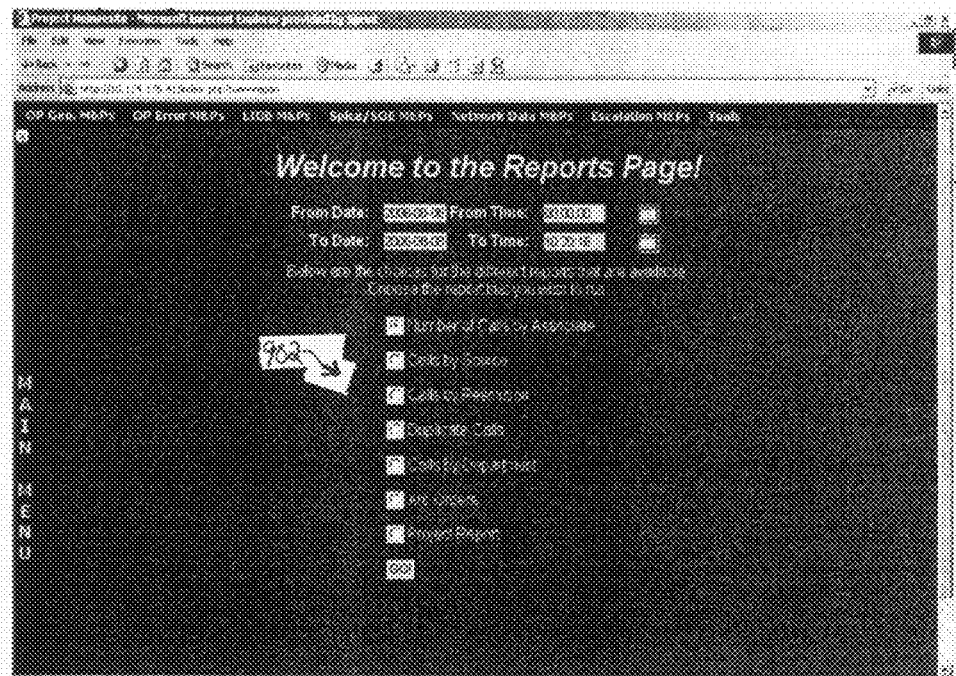
FIG. 9 is a screen shot of an exemplary graphical user interface for enabling a user to generate a report of service requests.

FIG. 9 is a screen shot of an exemplary graphical user interface 900 for enabling a user to generate a report of service requests. The user may enter or select dates and times between which to identify service request submissions or work performed in resolving a service request. The user may select type(s) of information 902 via graphical user elements (e.g., radio buttons) associated with service request submissions for which to generate a report. Alternative submission of types of information to generate a report may be utilized. An exemplary list of predefined report types may be available for selection, including, number of calls by associate, calls by source, calls by resolution, duplicate calls, calls by department, Arc orders, and project report. It should be understood that additional and/or other predefined report selections may be provided. Alternatively, the user may generate non-predefined reports by using different graphical user interface elements, as understood in the art. For example, a list of some or all parameters may be selectable for a user to generate a report during selected dates and times.

Figure 10:
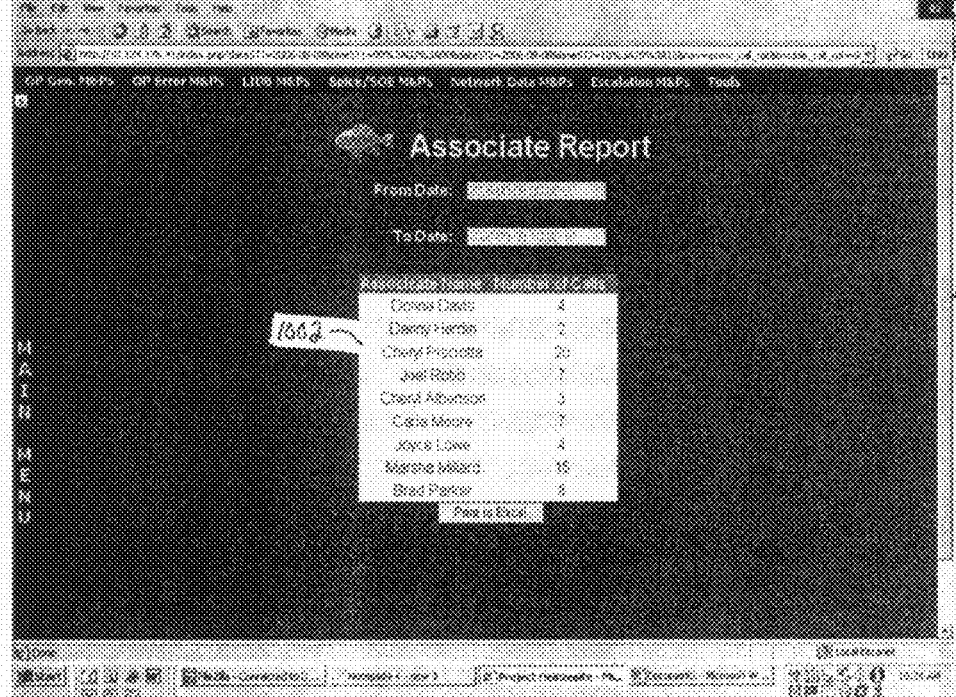
FIG. 10 is a screen shot of an exemplary graphical user interface for enabling a user to generate reports of employees receiving or responding to service requests.

FIG. 10 is a screen shot of an exemplary graphical user interface 1000 for enabling a user to generate reports of employees receiving or responding to service requests. Dates may be entered between which to identify work handled by a service provider employee, such as the number of calls, handled by a service provider employee. A list 1002 of employees and number of calls handled by each employee may be displayed. Other associate reports may be displayed, such as the number of service request resolutions, average time to resolve a service request, or any other service request parameter available to be generated based on information collected.

Figure 11:
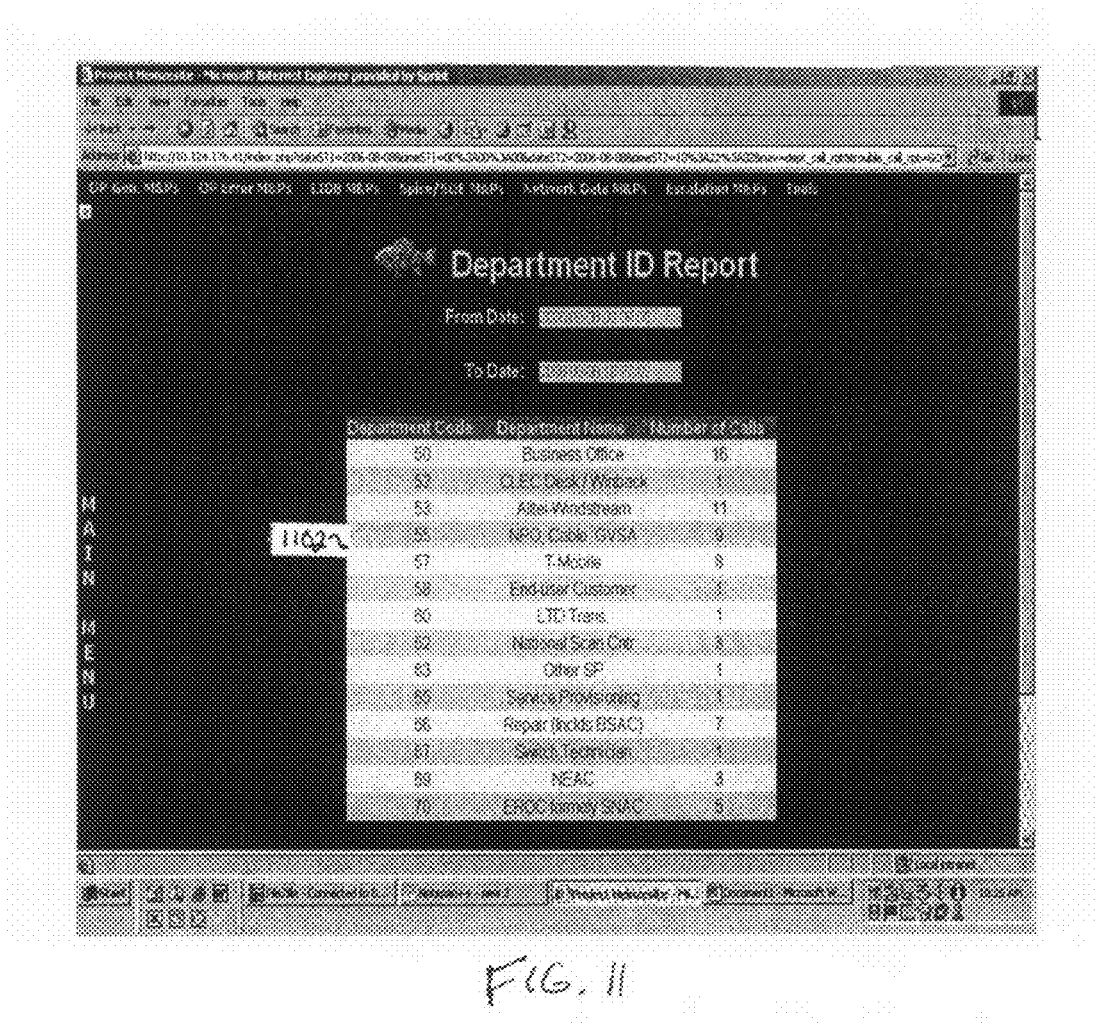

FIG. 11 is a screen shot of an exemplary graphical user interface 1100 for enabling a user to generate a report showing service requests by department. As shown, a list 1102 may be displayed to show department codes, departments, and number of called placed by each department or selected departments within an organization during a date range. It should be understood that other information, such as the type of service requests placed, may be displayed on a per department basis.

The above description has been presented for purposes of illustration and description, and is not intended to be exhaustive or limited to the illustrative embodiments in the form disclosed. Many modifications and variations will be apparent to those of ordinary skill in the art.

We claim:

1. A system for monitoring operations within an organization, said system comprising:
   a database configured to store information representative of communication history between employees and internal service provider employees within an organization, said database including at least one parameter associated with each communication between the employees, wherein the at least one parameter includes a pre-designated code indicative of a purpose of an associated communication, the pre-designated code selected from a plurality of pre-designated codes, each of the plurality of pre-designated codes indicative of a different problem encountered by the employees; and
   a computing system in communication with said database and configured to execute software for enabling the internal service provider employees to enter information associated with the communications and for generating reports that include statistics associated with the pre-designated code indicative of the purpose for a communication, wherein the software is further configured to determine based on the statistics whether to make corrections to certain products or processes to improve overall efficiencies in the organization; enable a user to select from a list of predefined reports that include number of calls by an associate, calls by source, calls by resolution, duplicate calls, calls by department, Arc orders, and project report; and receive user-entered information from an internal service provider employee indicating a current location of the internal service provider employee, wherein the current location of the internal service provider employee is determined based solely on the internal service provider employee selecting a location from a selectable list to indicate the internal service provider employee's current location, wherein the selectable list to indicate the internal service provider employee's current location includes an indication of whether the internal service provider employee is on a break, working with a particular employee, gone for day, and located at the internal service provider employee's desk.

2. The system according to claim 1, wherein the reports includes statistical information including an amount of time spent associated with each pre-designated code, wherein the reports further includes an identification of one or more of the pre-designated codes that are identified as a common problem within the organization based on the statistical information.

3. The system according to claim 1, wherein the at least one parameter includes a Wire Center parameter associated with a location that a caller employee works.

4. The system according to claim 1, wherein said database includes a telephone number parameter, wherein each communication record is related to a telephone number for which corrective action is to be performed.

5. The system according to claim 1, wherein the at least one parameter includes a Home Wire Center parameter for a service request.

6. The system according to claim 1, wherein said database includes a resolution code parameter indicative of how the communications are resolved.

7. The system according to claim 1, wherein the at least one parameter includes an amount of telephone numbers parameter handled during a trouble call.

8. A method for monitoring operations within an organization, said method comprising:
   storing, by a computing system, information representative of communication history between employees and internal service provider employees within an organization, the information including at least one parameter associated with the communications between the employees, wherein the at least one parameter includes a pre-designated code indicative of a purpose of an associated communication, the pre-designated code selected from a plurality of pre-designated codes, each of the plurality of pre-designated codes indicative of a different problem encountered by the employees;
   enabling, by the computing system, the internal service provider employees to enter information associated with the communications;
   enabling, by the computing system, the internal service provider employees to enter information indicating a current location of the internal service provider employees, wherein the current location of an internal service provider employee is determined based solely on the internal service provider employee selecting a location from a selectable list to indicate the internal service provider employee's current location;
   generating, by the computing system, reports that include statistics associated with the pre-designated code indicative of the purpose for a communication;

determining based on the statistics whether to make corrections to certain products or processes to improve overall efficiencies in the organization;

enabling a user to select from a list of predefined reports that include number of calls by an associate, calls by source, calls by resolution, duplicate calls, calls by department, Arc orders, and project report; and receiving user-entered information from an internal service provider employee indicating a current location of the internal service provider employee, wherein the current location of the internal service provider employee is determined based solely on the internal service provider employee selecting a location from a selectable list to indicate the internal service provider employee's current location, wherein the selectable list to indicate the internal service provider employee's current location includes an indication of whether the internal service provider employee is on a break, working with a particular employee, gone for day, and located at the internal service provider employee's desk.

9. The method according to claim 8, further comprising enabling the internal service provider employees to receive and enter information associated with functions performed by an internal service provider department within the organization.

10. The method according to claim 8, wherein the reports includes statistical information on an amount of time spent associated with each pre-designated code.

11. The method according to claim 8, further comprising displaying real-time information associated with a status of the internal service provider employees.

12. The method according to claim 11, further comprising enabling the internal service provider employees to enter information to be displayed to other internal service provider employees.

13. The method according to claim 8, wherein storing the at least one parameter includes storing a telephone number parameter, wherein each communication record is related to a telephone number for which corrective action is a database is to be performed.

14. The method according to claim 8, wherein generating at least one report includes generating percentages of communications from different departments within the organization.

15. The method according to claim 8, further comprising storing a resolution code parameter indicative of how the communications are resolved, wherein the resolution code parameter is an alphanumeric code.

16. The method according to claim 8, further comprising:
   aggregating the information associated with the communications; and
   determining whether the aggregated information is indicative of a problem affecting more than one of the employees.

\* \* \* \* \*